United States Patent [19]
Beekman

[11] 3,873,686
[45] Mar. 25, 1975

[54] PROCESS FOR PREPARING ALCOHOL-SOLUBLE ALUMINUM CHLORHYDROXIDE-POLYOL COMPLEXES AND PRODUCT

[76] Inventor: Stewart M. Beekman, P.O. Box 277, Signal Mountain, Tenn. 37377

[22] Filed: Oct. 28, 1971

[21] Appl. No.: 193,557

Related U.S. Application Data

[63] Continuation-in-part of Ser. No. 881,297, Dec. 1, 1969.

[52] U.S. Cl............... 424/47, 424/DIG. 5, 424/46, 424/68
[51] Int. Cl................................ A61k 7/00
[58] Field of Search.......................... 424/47, 68, 46

[56] References Cited
UNITED STATES PATENTS
3,507,896   4/1970   Jones et al...................... 424/68 X
3,523,129   8/1970   Holbert et al.................... 424/68 X
3,523,130   8/1970   Jones et al..................... 260/448 AD

*Primary Examiner*—Stanley J. Friedman
*Assistant Examiner*—Dale R. Ore

[57] ABSTRACT

A process is provided for the preparation of alcohol-soluble aluminum chlorhydroxide-polyol complexes having a high aluminum content and a low polyol content by blending solid aluminum chlorhydroxide particles with polyol in an amount less than about 0.5 mole per mole of aluminum chlorhydroxide.

The complexes thus obtained have especially desirable properties due to their high aluminum and low polyol content.

4 Claims, No Drawings

PROCESS FOR PREPARING ALCOHOL-SOLUBLE ALUMINUM CHLORHYDROXIDE-POLYOL COMPLEXES AND PRODUCT

This application is a continuation-in-part of Ser. No. 881,297, filed December 1, 1969.

Aluminum chlorhydroxides of the type $Al_n(OH)_mCl_{3n-m}$, and particularly the five-sixths basic aluminum chlorhydroxides $Al_2(OH)_5Cl$, are widely favored as the active ingredients of personal antiperspirant deodorants. They are water-soluble, and readily formulated in aqueous solutions, creams, or pastes, in which form they are quite stable, and highly effective. They are, however, organic solvent-insoluble, and consequently their formulation as aerosol and organic solvent liquid antiperspirant compositions has posed serious problems.

An aerosol solution must form a homogeneous system with the fluorocarbon propellants that are used therein, and organic solvent-insoluble materials are not capable of doing so. The aerosol composition should not cause can corrosion, or stress cracking of plastic containers. It must be stable, and it should not clog the aerosol valves and actuators during normal use. It should not contain significant amounts of iron, since iron deactivates hexachlorophene, and may catalyze perfume decomposition. In addition, it must, of course, have the desirable properties of other active forms of antiperspirants, in that it should be safe to use, effective, non-irritating, should not damage the clothing, and should not form a film or residue on the skin that is oily, dry, or tacky. It is unfortunate that the aluminum chlorhydroxides meet so many of these requirements, and yet are not useful per se because they do not meet the first two.

First attempts to formulate aerosol antiperspirant systems were based on available aluminum salts which were soluble in ethanol. Aluminum phenol sulfonate, which is soluble in ethanol, was perhaps the first to be used commercially. However, Kennon, *Journal of Pharmaceutical Science*, 54, 813 (1965), suggested that this salt is ineffective. In 1958, Brown and Govett, U.S. Pat. No. 2,823,169, dated Feb. 11, 1958, proposed a series of aluminum chlorhydroxy ethylates, but these have not been successfully commercialized. They are rather unstable, and contain significant amounts of iron. Neumann and Kottler, U.S. Pat. No. 2,872,379, dated Feb. 3, 1959, suggest aluminum alkoxy chlorides such as $Al_2(OR)_5Cl$ or $Al(OR)_2Cl$, but these compounds are quite insoluble in anhydrous ethanol. p Slater, Jass and Ugelow, U.S. Pat. No. 3,359,169, dated Dec. 19, 1967, and Jones and Rubino, U.S. Pat. Nos. 3,420,932, dated Jan. 7, 1969, No. 3,472,929, dated Oct. 14, 1969, No. 3,507,896, dated Apr. 21, 1970, No. 3,520,911, dated July 21, 1970, and No. 3,523,130, dated Aug. 4, 1970, propose reaction products or complexes of aluminum chloride or aluminum chlorhydroxide with polyols. Infra-red studies have shown the presence of new hydrogen bonds between the glycol and the hydroxyls of the aluminum chlorhydroxide that are not present in the glycol or aluminum chlorhydroxide alone. This suggests that a complex is formed. These compositions can be reduced to a solid powdered form, and are soluble in organic solvents such as ethanol, but because of the diluting effect of the polyol component, they have a rather low content of aluminum oxide, as compared to the aluminum chlorhydroxide.

A further problem is a noticeable stickiness or tackiness in the film formed on the skin from solutions of these compositions as a result of the content of free polyol. This disadvantage has been commented on by Sciarra in *Aerosol Age*, November, 1970. Moreover, these compositions when in liquid aerosol form require large concentrations both of emollients for good feel and of surfactants to prevent gelation, but these components may diminish antiperspirant effectiveness.

The antiperspirant compositions described by Slater et al. are prepared by reacting aluminum compounds of the formula

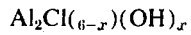

$$Al_2Cl_{(6-x)}(OH)_x$$

where $x$ is a number from two to five, with a polyol having two to three hydroxyl groups. The polyols include polyhydroxy alkylene compounds, e.g., glycols such as ethylene glycol, propylene glycol, 1,3-butanediol and 1,4-butanediol, as well as unsaturated aliphatic hydrocarbon materials such as 1,4-butanediol and the like. Aliphatic ether glycols having one or more ether linkages in the carbon chain (e.g. polyoxyalkylene glycols having a molecular weight up to about 500, preferably to about 200) are suitable, such as diethylene glycol, dipropylene glycol, triethylene glycol, and tetraethylene glycol, for example. Glycerol, diglycerol, 1,2,6-hexanetriol, 1,2,4-butanetriol, and trimethylolpropane are representative of polyhydroxy compounds having more than two hydroxy groups. Trimethylolpropane is representative of numerous branched chain polyhydric alcohols which can be employed, e.g. 2-methyl-2-ethyl-1,3-propanediol; 2-methyl-2,4-pentanediol.

To prepare the compounds, the hydroxylic reagent and an appropriate aluminum compound (such as a chlorhydroxide compound prepared, for example, according to the procedure mentioned in Australian Pat. No. 150,410 of Mar. 15, 1963) are contacted, in the proportions desired in the final product, in the presence of sufficient water to dissolve all of the aluminum compound. The compounds are obtained on removal of water from the system. Conveniently, the water is removed by evaporation at room temperature or below, or at an elevated temperature, suitably up to about 80°C. Particularly good results are obtained by evaporation at a temperature between about 50°–60°C, at which temperatures evaporation proceeds relatively rapidly, and there is no question of possible decomposition of the products by the use of excessive temperatures. At any of these temperatures, reduced pressure, for example, a pressure of 25 mm. Hg furnished by an aspirator, may be employed to speed the removal of water, but is not necessary. Also, reduced pressure may speed the removal of water when temperatures below room temperature (about 18°–25°C) are used, or reduce heating time when temperatures greater than 80°C are used. The solid product is soluble in alcohol and water and can be recrystallized from alcohol, e.g. ethanol, or water, or can be precipitated from alcohol or water solutions by the addition of a non-polar solvent such as ether or acetone.

The Jones et al. compositions (patent No. 3,420,932) are described as coordination compounds (complexes) containing aluminum, and having the formula $$Al_2(H_2O)_{0.7-1.1}(OH)_{4.9-5.1}Cl_{0.9-1.1}(R)_{0.7-1.3}$$

wherein R is the coordinating moeity of a polyhydroxy compound having a carbon chain in which at least two carbon atoms link a hydroxyl group to said chain.

The aluminum basic chloride and the polyhydroxy compound are combined to form a solution which is heated to form the aluminum complex. Preferably, though not necessarily, the heating is continued until substantially all excess water is expelled from the solution and a dry product is formed.

These references disclosing aluminum chlorhydroxidepolyol complexes prepare them by the same general method. The polyol and the aluminum chlorhydroxide or aluminum chlorhydroxide precursor are reacted in the presence of sufficient water to dissolve all of the aluminum chlorhydroxide. In U.S. Pat. Nos. 3,420,932 and 3,520,911, Jones and Rubino react the reagents at an elevated temperature within the range from about 50° to about 120°C, after which the solution is spray-dried to a water content of from 1 to 10 percent. In U.S. Pat. Nos. 3,472,929 and 3,507,896 to Jones and Rubino, the reaction between the polyol and the aluminum chlorhydroxide is carried out in water or aqueous ethanol solution at moderately elevated temperatures, from 75° to 110°C, followed by (azeotropic) distillation to remove the water. In U.S. Pat. No. 3,523,130 to Jones and Rubino, the polyol and aluminum chlorhydroxide are reacted in aqueous solution at from 50° to 120°C, after previously refluxing the aqueous aluminum chlorhydroxide solution for from 2 to 6 hours at from 100° to 110°C.

The difficulty with this procedure is that a very considerable proportion of the polyol that is added is lost in the course of the spray-drying. In U.S. Pat. No. 3,420,932, column 7, starting at line 34, Jones and Rubino state that in all cases an excess of the polyol is needed to prepare the complex, since a significant amount of the polyol is lost by evaporation. This loss may be as high as 30 to 50 percent, and from the data furnished in Example A in Example 1, column 5, of U.S. Pat. No. 3,523,130, the amount of polyol lost was 592 pounds, while the amount remaining in the product was only 566 pounds, so that the loss of polyol was in excess of 100 percent, based on the amount that remained in the complex.

These losses pose a considerable recovery problem. It is not only necessary to prevent loss of polyol to the atmosphere because of pollution difficulties, but the polyol is expensive, and such losses cannot be tolerated for economic reasons. In addition, the spray-dried product must be cooled with pre-dried air before collection, because it is sticky at the air-drying temperature, which increases operating costs.

In accordance with the invention, solid aluminum chlorhydroxide in particulate form is blended and reacted directly with polyol in an amount of less than about 0.5 mole per mole of aluminum chlorhydroxide. Reaction under these conditions avoids the necessity of adding or removing water or other solvents, as required in the course of the reaction in the procedures previously employed, and the use of small amounts of polyol eliminates entirely the sticky residue qualities of prior complexes, due to their high polyol content, as well as providing a complex having a much larger amount of aluminum per unit weight. The complexes prepared in accordance with the process of the invention are alcohol-soluble, and retain the other desirable and effective properties of the aluminum chlorhydroxide-polyol complexes of the prior art.

Because of the higher proportion of aluminum (calculated herein as $Al_2O_3$, for convenience of reference), the complexes prepared by the process of the invention are more effective antiperspirants, particularly in aerosol form, a form for which they are well adapted because of their alcohol solubility. Since the complexes have a low free water content, partially because of the fact that no water is required in the reaction between aluminum chlorhydroxide and polyol, the complexes of the invention can be readily formulated into non-corrosive aerosol systems, using lined cans and standard valves and springs. The pH values of aerosol systems prepared with the alcohol-soluble aluminum chlorhydroxide complexes of the invention are about 2.5 or higher, when measured in anhydrous alcohol solution, and higher than 4.0 when such alcohol solutions are diluted with five parts of water before pH measurement. Thus, these solutions are compatible with many perfume compositions which are vulnerable to more highly acid systems. Because of the low polyol contents, their skin residues (which are high in active aluminum content) are not sticky, which results in a better skin feel.

The process of the invention offers a further advantage in that the manufacture of the complexes can be combined with manufacture of the solid aluminum chlorhydroxide powder in particulate form. Aluminum chlorhydroxide is normally prepared in aqueous solution, and in the process of the invention this aqueous solution can be spray-dried in the normal way, and the polyol blended with the spray-dried particles before they emerge from the spray dryer. The product that is recovered from the spray dryer is then the aluminum chlorhydroxide-polyol complex, reaction occurring in the brief transit time from the point where the polyol is blended with the particles to the point where the particles emerge from the spray dryer. No modification of the spray drying equipment is required, except for provision of means for blending the polyol with the spray-dried particles.

It will thus be evident that it is quite unnecessary to prepare aluminum isopropylate in the course of manufacture of the aluminum chlorhydroxide-polyol complexes of the invention. This avoids an expensive intermediate step, as well as the attendant contamination, due to the isopropanol.

The aluminum chlorhydroxide-polyol complexes in accordance with the invention can be defined by the formula $$Al_x(OH)_y Cl_{3x-y} \cdot n(H_2O) \cdot polyol_{0.01-0.5x}$$

$x$ has a value from 2 to 5.
$y$ has a value from 2 to 14.
$n$ is a number from zero to five.

Enough polyol is present in the complex to render the complex alcohol-soluble, as indicated. Any amount within the range from 0.01 to 0.5 mole per mole of aluminum chlorhydroxide can be used. The manner in which the polyol is complexed with the aluminum chlorhydroxide is not known, but the fact that a complex is formed is evidenced by the alcohol solubility of the material, inasmuch as aluminum chlorhydroxide which is not in the complex form is alcohol-soluble. In fact, the complexes of the invention are completely soluble in alcohol.

The invention is applicable to any aluminum chlorhydroxide having the formula

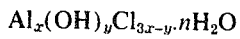

$n$ is a number from zero to five.
$x$ is a number from 2 to 5.
$y$ is a number from 2 to 14.

Representative of such aluminum chlorhydroxides are $Al_2(OH)_2Cl_4$, $Al_2(OH)_4Cl_2$, $Al_5(OH)_9Cl_3$, $Al_4(OH)Cl_3$, $Al_3(OH)_6Cl_3$ and $Al_2(OH)_5Cl$. Particularly fine results are obtained with an aluminum chlorhydroxide having an Al:Cl molar ratio from about 1:2 up to about 2.1:1, more advantageously from about 1:1 to about 2:1. The five-sixths basic material ($Al_2(OH)_5Cl$) is preferred.

The aluminum chlorhydroxide can be prepared in solid particulate form by any known procedure. The aluminum chlorhydroxide can be prepared in aqueous solution, and the solution dried just before blending with the polyol, in a spray dryer, tray dryer, or other drying apparatus.

As a source of aluminum chlorhydroxide, a 50 percent aqueous solution of a five-sixths basic aluminum chlorhydroxide prepared as described in U.S. Pat. No. 2,196,016 to Huehn, patented on Apr. 2, 1940, is preferred. This compound is $Al_2)OH)_5Cl$ and the concentration of aluminum as $Al_2O_3$ in the solution is 23.5 percent. The reaction should be carried out in such a manner that the product contains a relatively low concentration of iron.

The aluminum chlorhydroxide can be reduced to solid particulate form by any conventional drying method, such as spray-drying, tray-drying, or drying using a wiped film evaporator.

Any particle type can be used, such as powders, pellets, grains, granules, flakes, chips, and crystals. The more finely divided the material, the more the blending is facilitated. The particle size is not critical, but can range from 5$\mu$ to 10 mesh or larger.

The preferred type of aluminum chlorhydroxide particles are spray-dried powders. Such particles appear to be quite advantageous, perhaps because of the porous nature of the particles. These particles are generally in the form of hollow spheres and have an exceptionally high surface area, which may also facilitate the blending.

The aluminum chlorhydroxide in particulate form is merely blended with the polyol. Any type of solids mixer can be employed, such as a bowl-type dough mixer with revolving planetary mixing blades, double or single carbon-type mixers, sigma blade dough mixers, change can mixers, horizontal mullers such as the Simpson Intensity Mixer, or double-cone or V-type rotating mixers with internal agitators. The objective is to thoroughly mix and disperse the polyol in the aluminum chlorhydroxide particle.

If the aluminum chlorhydroxide is available in aqueous solution or is being prepared directly in aqueous solution, a preferred mixing technique is to blend the polyol with the particles in the spray dryer shortly after the particles have been formed, and before they emerge from the dryer. The polyol can be mixed with the spray-dried particles in the dryer using conventional atomizing devices.

For example, the aqueous aluminum chlorhydroxide solution, at a rather high solids concentration, of the order from about 40 to about 75 percent, is pumped to the first atomizing device in a spray dryer. This may be a mechanically rotating disk or bowl, a high-pressure nozzle or a two-fluid nozzle with air under pressure operating the nozzle. After leaving the atomizing device, the finely-divided droplets of aqueous aluminum chlorhydroxide solution are dispersed in the hot air system of the dryer, and the moisture is removed from the droplets in a matter of seconds at the elevated drying temperatures. In a portion of a dryer where the particles are solid and dry, or virtually so, but still suspended in the moving air stream, the polyol is atomized and dispersed across the air-borne stream of spray-dried particles. The particles thereby become uniformly coated with the finely-divided atomized liquid polyol.

In this portion of the dyrer, the temperatures are so low that polyol is not volatilized, and the amount of polyol and the rate of introduction are adjusted according to the rate of flow of the stream of spray-dried particles, so that substantially all of the polyol contacts and is absorbed on the particles. The polyol is rapidly absorbed on the dry particles, and quickly reacts therewith, so that by the time the particles emerge from the dryer, the aluminum chlorhydroxide-polyol complex has been formed more or less completely.

The aluminum chlorhydroxide solution can also be dried on the surface of a moving stainless steel belt. Drying is accomplished by flowing heated air across the moving belt. The polyol can then be sprayed onto the dried particles before the particles are discharged from the belt.

It is also possible to prepare the pulverized or powdered or particulate aluminum chlorhydroxide by any procedure and then suspend them in a moving inert gas such as air, after which the polyol is spray-coated onto the air-borne or gas-borne particles.

The product produced by these various procedures is highly soluble in anhydrous ethanol at room temperature or with mild heating despite the fact that it contains less than one-half mole of polyol per mole of aluminum chlorhydroxide.

The complexes of the invention can be formed from an aliphatic, cycloaliphatic or aromatic polyol, including, for example, 1,2-propylene glycol, 1,3-propylene glycol, 1,1,1-trimethylolpropane, 1,3-butylene glycol, glycerol, 2-methyl-2,4-pentanediol, neopentyl glycol, polyethylene glycols having a molecular weight within the range from 400 to about 1500, p-xylene-alpha, alpha-diol, polyepichlorohydrin, butyne-1,4-diol, 2-ethyl-1,3-hexanediol, and polypropylene glycol having a molecular weight of from 400 to 1000. The preferred polyol is propylene glycol-1,2, although propylene glycol-1,3 can also be used.

The aluminum chlorhydroxide-polyol complexes of the invention contain 46 percent or more aluminum as $Al_2O_3$. This is 28 percent more aluminum than the aluminum content of the complexes described in U.S. Pat. No. 3,420,932 which contain 1 mole of propylene glycol per mole of aluminum chlorhydroxide. Martin et al., *Drug and Cosmetic Industry*, November, 1966, in the article entitled "A New Aerosol Antiperspirant," describe the properties of this material, and in FIG. 3 show the relationship between percent sweat reduction obtained on human subjects against the concentration of aluminum ions. The curve shows that the percent reduction of perspiration is directly proportional to the weight (in mg.) of aluminum applied to the skin. Because the active aluminum content of the aluminum chlorhydroxide-polyol complexes of the invention is 28 percent greater than the material described by Martin et al., it is apparent that a corresponding improvement in effectiveness in the reduction of perspiration can be obtained. Moreover, 7 percent of the aluminum chlorhydroxide-polyol complex of the invention is at least as effective against perspiration as 9 percent of the product described by Martin et al. Moreover, the amount of excipient propylene glycol deposited on the skin from the complexes of the Martin et al. article is 2½ times that deposited from 7 percent of the aluminum chlorhydroxide-polyol complexes of the invention. This is quite important, from the standpoint of the sticky feel due to polyol residues obtained, when the product described by Martin et al. is used on the human skin.

The reaction between the aluminum chlorhydroxide and the polyhydroxy compound can be effected at room temperature or elevated temperature, within the range from about 25° to about 120°C. A temperature range of 60° to 105°C is optimum. The reaction is quite rapid and is complete in a few minutes at the more elevated temperatures, and a little longer at lower temperatures.

After blending of the aluminum chlorhydroxide and polyol is complete and the complex has been formed, the complex is ready to use without further treatment, as the active component in antiperspirant formulations of all types. Because it is soluble in ethanol or other aliphatic alcohol solution, it is particularly adapted for use in aerosol formulations and in liquid formulations for roll-on applications in which alcohol is used as a solvent. However, it can be employed in any type of antiperspirant composition, including liquids, flowable, semiflowable and solid creams, sticks, lotions, sprays, powders, and powered aerosols.

The liquid antiperspirant compositions contain as the essential ingredients the aluminum chlorhydroxide complex, an alcohol solvent (in which the reaction product is soluble), and, if desired, water. A perfume and a coloring agent are usually also added.

A propellant composition contains in addition a propellant base. The propellant should have a vapor pressure at room temperature within the range from about 25 to about 60 psi. The materials meeting this qualification are fluorine-containing or fluorine- and chlorine-containing aliphatic hydrocarbons having from one to four carbon atoms, such as for example, dichlorotetrafluoroethane, dichlorotrifluoromethane, octafluorocyclobutane, and trichloromonofluoromethane. Mixtures of these can also be used, such as mixtures of dichlorodifluoromethane and trichloromonofluoromethane. The propellant normally comprises from about 25 to about 75 percent of the composition, and the aluminum chlorhydroxide from 4 to 15 percent of the composition. The solvent is within the range from about 20 to about 60 percent by weight of the composition. Softening agents, perfumes, solubilizers and antitack agents can also be added.

A cream formulation is based on an aluminum chlorhydroxide-aliphatic alcohol solution, with the addition of a thickening agent and polyol fatty acid esters in amounts to provide the desired consistency, ranging from a readily flowable liquid to a thick, viscous or non-flowable paste. Thickening agents which can be employed include alcohol-soluble cellulose derivatives, such as methyl cellulose, ethyl cellulose, ethyl hydroxyethyl cellulose, and propyl hydroxyethyl cellulose. Fatty acid esters which can be used include polyoxyethylene monostearate and glyceryl monostearate. Perfumes, coloring agents and other solvents can also be added.

A roll-on antiperspirant composition is based on an aluminum chlorhydroxide-aliphatic alcohol solution together with antitack agents and film-forming resins.

An aerosol antiperspirant composition including an aluminum chlorhydroxide complex of the invention and a finely-divided alcohol-insoluble aluminum chlorhydroxide, such as a five-sixths basic aluminum chlorhydroxide, $Al_2(OH)_5Cl$, is also advantageous. Such a composition contains aluminum chlorhydroxide complex of the invention in solution in a lower aliphatic alcohol, such as ethanol, and a propellant base; finely-divided alcohol-insoluble aluminum chlorhydroxide; and from 0.5 to about 5 percent suspending agent, such as fumed silica or fumed alumina; and, optionally, an oil or emollient, suspended or dispersed in the alcohol.

The following is typical:

| | |
|---|---|
| Alcohol-soluble aluminum chlorhydroxide of the invention | 4% to 15% (solids basis) |
| Alcohol-insoluble aluminum chlorhydroxide powder (finely-divided) | 0.5% to 5% preferably 1% to 3% |
| Anhydrous ethanol | 5% to 30% |
| Emollient, antitack agent, perfume solubilizer | 0% to 10% |
| Suspending agent | 0.3% to 2% |
| Perfume | 0% to 1% |
| Liquefied propellant | 40% to 90% |

The suspended or dispersed materials should be quite finely-divided, to avoid plugging of the valves of the aerosol container. Preferably, the particles should be liquid or, if solid, have a size below 100 μ, and preferably below 50 μ.

The types of antiperspirant formulations in which the aluminum chlorhydroxide complexes of the invention can be used are further illustrated in Chapter 32, pages 717 to 739 of *Cosmetics Science and Technology*, Interscience Publishers, New York (1957), the disclosure of which is hereby incorporated by reference. The compositions can be used as the source of aluminum chlorhydroxide in any of the formulations containing aluminum chlorhydroxides shown therein.

The aluminum chlorhydroxide complexes in accordance with the invention are compatible with all of the various ingredients normally employed in compositions of these types.

The following Examples in the opinion of the inventor represent preferred embodiments of the invention.

EXAMPLE 1

An alcohol-soluble five-sixths basic ($Al_2(OH)_5Cl$) aluminum chlorhydroxide-propylene glycol complex containing 0.5 mole propylene glycol per mole of aluminum chlorhydroxide was prepared as follows:

Three hundred pounds of a 50 percent aqueous solution of aluminum chlorhydroxide $Al_2(OH)_5Cl$ was prepared by reacting 5 atomic weights of aluminum powder with 1 mole of aluminum chloride in aqueous solution at 80° to 90°C followed by filtration to remove trace insolubles. The concentration was adjusted to yield an aluminum content of 23.5 percent (calculated as $Al_2O_3$) in the clear filtrate. This aqueous solution was pumped continuously at a rate of about 1 pound per minute into a two-fluid nozzle of a spray dryer. The second fluid was air, at about 20 psig of pressure. The temperature of the inlet air at the nozzle was 375°F; the exit air temperature at the dry end of the spray dryer was about 170°F.

Pumping of the 50 percent aluminum chlorhydroxide solution to the nozzle in the spray dryer was begun, and, shortly thereafter, a second pump adapted to feed propylene glycol through a second two-fluid nozzle at a flow rate of 0.087 pound per minute via a calibrated Rotameter valve into the spray dryer. The propylene glycol entered the spray dryer at a level where the spray-dried aluminum chlorhydroxide solution had dried to solid spray-dried aluminum chlorhydroxide particles. In this way, the spray-dried particles while air-borne were uniformly coated with a thin film of propylene glycol, obtained by coalescence of the sprayed propylene glycol droplets upon the solid aluminum chlorhydroxide particles. The air-borne particles, now composed of a blend of aluminum chlorhydroxide and polyol, more or less completely reacted to form a complex, was separated from the air as it exited from the cone of the spray dryer using a high efficiency-type cyclone separator and a bag-type air filter. By this time, all of the propylene glycol had been absorbed on the spray-dried particles of aluminum chlorhydroxide, and no propylene glycol could be detected in the exit gases. From a total of 150 pounds aluminum chlorhydroxide solids and 26.2 pounds of propylene glycol there was recovered 175 pounds of aluminum chlorohydroxide-propylene glycol complex as a finely-divided white powder (99% yield), which analyzed as follows:

| | |
|---|---|
| Aluminum as $Al_2O_3$ | 46.8% |
| Chlorides as Cl | 16.5% |
| Propylene glycol | 17.5% |

The formula of the powder thus was $Al_2(OH)_5Cl.nH_2O.(propylene\ glycol)_{0.5}$ The value of $n$ was about 0.33, in this powder.

One hundred pounds of this powder was dissolved in 300 pounds of anhydrous ethanol in a closed vessel provided with a propeller-type mixer. The temperature of the alcohol ranged from 25° to 35°C. Approximately 30 minutes mixing was required, before solution became complete. The clear solution was filtered through an asbestos cellulose pad of medium porosity to remove trace insolubles.

The clear water-white slightly viscous alcoholic solution had the folowing analysis:

| | |
|---|---|
| Aluminum as $Al_2O_3$ | 11.7% |
| Chlorides as Cl | 4.1% |
| Propylene glycol | 4.4% |
| Ethanol | 75.0% |

The pH of this 25 percent alcoholic solution was 3.0. After dilution with 5 parts of water, the pH was 4.3.

Several aerosol antiperspirants were prepared according to the following formula, using this alcoholic solution:

| Ingredient | % by Weight |
|---|---|
| $Al_2(OH)_5Cl.0.33\ H_2O.\ (propylene\ glycol)_{0.5}$ (25% solution in anhydrous ethanol, 11.7% $Al_2O_3$) | 25.6 |
| Hexachlorophene | 0.1 |
| Silicone fluid | 1.0 |
| Crodaphos (0.1 N, neutral) | 0.5 |
| Crodaphos (0.1 N, acid) | 0.5 |
| Perfume, standard aromatic | 0.1 |
| Ethanol, anhydrous | 23.1 |
| Propellant (Freon 12/114 60/40 mixture) | 50.0 |

Aerosol cans with organosol linings and provided with Type 316 stainless steel precision valve springs were filled with this aerosol antiperspirant composition, and stored at 45°C for 6 months.

At the conclusion of this period, the linings and valve components were intact and not corroded, despite the high temperature storage. The integrity of the formulation was well maintained. Subjective testing by several subjects for the formulation indicated a positive antiperspirant effectiveness.

Another portion of the aluminum chlorhydroxide-propylene glycol complex was used to prepare an aerosol antiperspirant of the following formulation:

| Ingredient | % by Weight |
|---|---|
| Aluminum chlorhydroxide powder $(Al_2(OH)_5Cl.nH_2O.(propylene\ glycol)_{0.5})$ | 3.0 |
| Isopropyl myristate | 6.32 |
| Hexachlorophene | 0.8 |
| Fumed silica dispersing agent | 0.4 |
| Perfume | 0.3 |
| Propellant (Freon 12/11 60/40 mixture | 90.0 |

This formulation was converted into a powder immediately on leaving the aerosol container, and landed on the human skin in the form of a powder. It was an effective antiperspirant.

Another portion of the aluminum chlorhydroxide-propylene glycol complex powder was used in a formulation in admixture with an aluminum chlorhydroxide-propylene glycol complex in accordance with U.S. Pat. No. 3,420,932, containing 1 mole of propylene glycol to each mole of aluminum chlorhydroxide in the complex. The following formulation was prepared:

| Ingredient | % by Weight |
|---|---|
| Aluminum chlorhydroxide-propylene glycol complex of Example 1 $(Al_2(OH)_5Cl.nH_2O.(propylene\ glycol)_{0.5})$ | 5.0 |
| Aluminum chlorhydroxide-propylene glycol complex $(Al_2(OH)_5Cl.nH_2O.(propylene\ glycol)_1)$ | 3.0 |
| Hexachlorophene | 0.1 |
| Perfume | 0.1 |
| Crodaphos (0.1 N, acid) | 0.5 |
| Crodaphos (0.1 N, neutral) | 0.5 |
| Silicone fluid | 1.0 |
| Anhydrous ethanol | 40.3 |
| Propellant (Freon 12/114 60/40 mixture) | 50.0 |

This composition was an effective antiperspirant, and had an appreciably less sticky feel than a similar antiperspirant in which all of the aluminum chlorhydroxide-propylene glycol complex was the 1:1 molar ratio material.

A further portion of the aluminum chlorhydroxide-propylene glycol complex was used in an aerosol antiperspirant formulation in combination with the product of U.S. Pat. No. 3,444,226, the cyclic compound formed by the reaction of 1 mole of chloroaluminum diisopropoxide with 1 mole of propylene glycol in anhydrous isopropanol, 2-chloro-4-methyl-1,3,2-dioxaluminane. This is a rather corrosive material, but when used in blends with the aluminum chlorhydroxide-propylene glycol$_{0.5}$ complex of the invention, the corrosivity is appreciably reduced.

The formulation prepared was as follows:

| Ingredient | % by Weight |
|---|---|
| Aluminum chlorhydroxide-propylene glycol complex ($Al_2(OH)_5Cl \cdot nH_2O \cdot (propylene\ glycol)_{0.5}$) | 5.0 |
| 2-chloro-4-methyl-1,3,2-dioxaluminane (31.5% $Al_2O_3$) | 3.0 |
| Hexachlorophene | 0.1 |
| Crodaphos (0.1 N, acid) | 0.5 |
| Crodaphos (0.1 N, neutral) | 0.5 |
| Silicone fluid | 1.0 |
| Perfume | 0.1 |
| Emollient | 1.0 |
| Ethanol anhydrous | 37.8 |
| Propellant (Freon 12/114 60/40 mixture | 50.0 |

This antiperspirant formulation was an effective antiperspirant, and showed reduced corrosiveness when stored in lined aerosol cans for 6 months at 45°C.

A further portion of the aluminum chlorhydroxide-propylene glycol complex was used in an aerosol antiperspirant formulation in accordance with British Pat. No. 1,125,256, containing an aluminum chlorhydroxide-phenol sulfonate complex. The resulting formulation had an appreciably higher aluminum content than the aluminum chlorhydroxide-phenol sulfonate complex alone. The formulation used was as follows:

| Ingredient | % by Weight |
|---|---|
| Aluminum chlorhydroxide $Al_2(OH)_5Cl \cdot nH_2O \cdot (propylene\ glycol)_{0.5}$ (46.6% $Al_2O_3$) | 5.0 |
| Aluminum chlorhydroxide zinc-p-phenol sulfonate complex (6:1 molar ratio) 35.7% $Al_2O_3$ | 3.0 |
| Hexachlorophene | 0.1 |
| Crodaphos (0.1 N, acid) | 0.5 |
| Crodaphos (0.1 N, neutral) | 0.5 |
| Silicone fluid | 1.0 |
| Perfume | 0.1 |
| Ethanol anhydrous | 39.8 |
| Propellant (Freon 12/114 60/40 mixture) | 50.0 |

This formulations was an effective antiperspirant, and showed good storage stability.

EXAMPLE 2

An alcohol-soluble aluminum chlorhydroxide-trimethylolpropane complex was prepared, containing 0.5 mole trimethylolpropane per mole of aluminum chlorhydroxide.

Three hundred pounds of 50 percent aqueous aluminum chlorhydroxide solution (5/6 basic, $Al_2(OH)_5Cl$, 23.5% $Al_2O_3$) was prepared using the same procedure as set forth in Example 1. This solution was spray-dried under the conditions set forth in Example 1. Trimethylolpropane was sprayed onto the spray-dried particles at a rate of liquid aluminum chlorhydroxide solution at about 1 pound per minute. Since trimethylolpropane is a solid at room temperature, it was necessary to melt it, and to heat the pumping system at a temperature above the melting point of the trimethylolpropane up to the point where it was sprayed into the spray-drying chamber. The inlet air temperature of the spray dryer was 380°F, and the outlet air temperature was 170°F.

The spray-dried particles of aluminum chlorhydroxide were uniformly coated with the molten trimethylolpropane, which was absorbed on and reacted with the particles quite rapidly, so that by the time the particles emerged from the spray dryer they were more or less completely reacted to form the aluminum chlorhydroxide-trimethylolpropane complex. The free-flowing spray-dried complex particles were readily dissolved in anhydrous ethanol.

The particles analyzed as follows:

| | |
|---|---|
| Aluminum oxide as $Al_2O_3$ | 41.4% |
| Chlorides as Cl | 14.3% |
| Trimethylolpropane | 27.1% |

From a total of 150 pounds aluminum chlorhydroxide solids and 46.3 pounds of trimethylolpropane, a total of 193 pounds of spray-dried particles was recovered, which represents an overall yield of about 98.55 percent.

The complex corresponded to the formula $Al_2(OH)_5Cl \cdot nH_2O \cdot (trimethylolpropane)_{0.5}$. $n$ in this case was 0.5.

One hundred pounds of this material was dissolved in 300 pounds of anhydrous ethanol in a closed vessel at 30°C using a propeller-type mixer. Dissolution time was approximately 30 minutes at room temperature. The clear water-white slightly viscous alcoholic solution was filtered under pressure through an asbestos cellulose filter pad of medium porosity to remove trace insolubles. The composition of the resulting solution was as follows:

| | |
|---|---|
| Aluminum as $Al_2O_3$ | 10.3% |
| Chlorides as Cl | 3.6% |
| Trimethylolpropane | 6.8% |
| Ethanol anhydrous | 75.0% |

The pH of the 25 percent ethanol solution was 3.0. After dilution with 5 parts of water, the pH was 4.3.

Several aerosol antiperspirant compositions were prepared using this solution, according to the following formulation:

| Ingredient | % by Weight |
|---|---|
| $Al_2(OH)_5Cl \cdot nH_2O \cdot (propylene\ glycol)_{0.5}$ (25% solution in anhydrous ethanol, 10.3% $Al_2O_3$) | 25.6 |
| Hexachlorophene | 0.1 |
| Silicone fluid | 1.0 |
| Crodaphos (0.1 N, neutral) | 0.5 |
| Crodaphos (0.1 N, acid) | 0.5 |
| Perfume, standard aromatic | 0.1 |
| Ethanol, anhydrous | |
| Propellant (Freon 12/114 60/40 mixture) | 50.0 |

Aerosol cans with organosol linings and provided with Type 316 stainless steel precision valve springs were filled with this aerosol antiperspirant composition, and stored at 45°C for six months.

At the conclusion of this period, the linings and valve components were intact and not corroded, despite the high temperature storage. The integrity of the formulation was well maintained. Subjective testing by several subjects for the formulation indicated a positive antiperspirant effectiveness.

EXAMPLE 3

266 g. of a 5/6 basic aluminum chlorhydroxide (Al$_2$(OH)$_5$Cl) powder was prepared by reacting 5 atomic weights of aluminum powder with 1 mole of aluminum chloride in aqueous solution at 80° to 90°C. The reaction mixture was filtered, and the solid was dried in thin layers in trays while blowing air at 180°F over the material. The resulting cake was pulverized to a 100-mesh powder with a hammer mill, using a 0.013-inch herringbone screen. The powder had an aluminum content of 43.5 percent (as Al$_2$O$_3$) and a chlorine content (as Cl$^-$) of 15.26 percent.

This material was converted to the propylene glycol blend or complex. The powder was placed in a stainless steel one-gallon bowl of a mixer generally used for cake batter. 37.8 g. of propylene glycol was added dropwise to the basic aluminum chlorhydroxide over a 30-minute period, with stirring. The resulting blend was a dense free-flowing powder, composed of small granules. The mixture was ground in dry air in a screen-type hammer mill to about 100-mesh size.

EXAMPLE 4

A five-sixths basic aluminum chlorhydroxide powder 100 mesh was prepared in a manner similar to that described in Example 3. It contained 45.8 percent aluminum (as Al$_2$O$_3$), 16.0 percent chlorine (as Cl$^-$), and 12.5 percent water (by the Karl Fischer method).

214 g. of the five-sixths basic aluminum chlorhydroxide was added to the stainless steel bowl of a small dough mixer, and agitation begun. 36.5 g. of 1,2-propylene glycol was added dropwise over a 35-minute period, with constant stirring. The resulting solid, 250.5 g. of aluminum chlorhydroxide-propylene glycol complex, was pulverized to about 100 mesh, using a laboratory hammer mill.

EXAMPLE 5

269 g. of a finely-divided five-sixths basic aluminum chloride hydroxide powder was mixed for 30 minutes with 54 g. of 1,2-propylene glycol using a laboratory light-duty dough mixer. The latter was added dropwise during a 30-minute period. Mixing was continued for an additional 15 minutes. The resulting free-flowing powder was pulverized through a laboratory screen-type hammer mill to about 100 mesh size.

EXAMPLE 6

277 g. of a five-sixths basic aluminum chlorhydroxide powder prepared as described in Example 3, and containing 45.8 percent aluminum (as Al$_2$O$_3$), 16.0 percent chlorine (as Cl$^-$), and 12.5 percent water by the Karl Fischer method, was added to a mixing bowl of a cake mixer. With continuous agitation, 47.3 g. propylene glycol was added dropwise over a 30-minute period. Mixing was continued for 10 minutes. The resulting free-flowing powder was pulverized in a laboratory hammer mill.

EXAMPLE 7

167 g. of a 5/6 basic aluminum chlorhydroxide powder containing 43.5 percent aluminum (as Al$_2$O$_3$), 15.3 percent chlorine (as Cl$^-$) and 16.9 percent water by the Karl Fischer method was heated in a closed container to about 65°C. It was then added to a preheated bowl of a laboratory cake mixer. 49 g. of melted trimethylolpropane was added dropwise, over a 30-minute period, with continued stirring. The resulting mixture was a free-flowing powder in the form of small granules.

EXAMPLE 8

A five-sixths basic aluminum chlorhydroxide powder was prepared in the manner described in Example 3. The dry powder contained 45.9 percent aluminum as Al$_2$O$_3$, 15.6 percent chloride and 13 percent free and combined water by the Karl Fischer method. 1000 g. of the powder was added to a bowl of a 1 gallon dough mixer. 171 g. of 1,2-propylene glycol was added dropwise with agitation over about a one-hour period. This is equivalent to one-half mole of propylene glycol per mole of aluminum as Al$_2$O$_3$. The resulting 1171 g. of free-flowing powder containing some granules was reduced to about 60 mesh with a stainless steel screen-type hammer mill. The powder contained 39.4 percent aluminum as Al$_2$O$_3$, 13.4 percent chlorides and 14.5 percent propylene glycol. It was labeled five-sixths basic aluminum chlorhydroxide: propylene glycol blend, mold ratio 1:0.5.

EXAMPLE 9

A five-sixths basic aluminum chlorhydroxide powder was prepared in the manner described in Example 3. It contained 45.9 percent aluminum as Al$_2$O$_3$. 300 g. was added to the bowl of a dough mixer and 135 g. butylene glycol was added dropwise, with continued agitation, over a 1 hour period. The resulting 435 g. of free-flowing powder blend contained some granules. It was pulverized in a screen-type hammer mill with a large-opening screen. The powder contained 0.5 mole of butylene glycol per mole of aluminum as Al$_2$O$_3$.

Having regard to the foregoing disclosure, the following is claimed as the inventive and patentable embodiments thereof:

1. An effective antiperspirant composition comprising an aluminum chlorhydroxide-polyol complex having an alumina:polyol ratio within the range from about 1:0.01 to about 1:0.5, prepared by blending solid aluminum chlorhydroxide in particulate form directly with a polyol in an amount of less than about 0.5 mole per mole of aluminum chlorhydroxide, calculated as Al$_2$O$_3$, and reacting the aluminum chlorhyroxide with the polyol to form the complex, the aluminum chlorhydroxide having the formula:

$$Al_x(OH)_y Cl_{3x-y} \cdot nH_2O$$

where $n$ is a number from zero to five, $x$ is a number from 2 to 5, and $y$ is a number from 2 to 14; and the polyol having from two to three hydroxy groups and being selected from the group consisting of 1,2-propylene glycol; 1,3-propylene glycol; 1,3-butylene glycol; glycerol; 2-methyl-2,4-pentanediol; 1,1,1-trimethylolpropane; neopentyl glycol; polyethylene glycol having a molecular weight within the range from 400 to about 1500; p-xylene-$\alpha$, $\alpha$-diol; polyepichlorohydrin; butyne-1,4-diol; 2-ethyl-1,3-hexane-diol; and polypropylene glycol having a molecular weight from 400 to 1000; and ethanol.

2. An effective antiperspirant composition according to claim 1, in which the aluminum chlorhydroxide-polyol complex has the formula:

$$Al_x(OH)_y Cl_{3x-y} \cdot n(H_2O) \cdot polyol_{0.01-0.5x}$$

wherein: $x$ is a number from 2 to 5, $y$ is a number from 2 to 14, and $n$ is a number from 0 to 5.

3. The liquid antiperspirant composition having a pH higher than 4, comprising an aluminum chlorhydroxide-polyol complex according to claim 1, ethanol, and water.

4. A stable aerosol antiperspirant composition comprising the aluminum chlorhyroxide-polyol complex according to claim 1 in an amount within the range from about 4 to about 15 percent, ethanol in an amount within the range from about 5 to about 30 percent, alcohol-insoluble aluminum chlorhydroxide powder in an amount within the range from about 0.5 to about 5 percent, and an amount within the range from about 40 to about 90 percent of a propellant having a vapor pressure at room temperature within the range from about 25 to about 60 psi, selected from the group consisting of dichlorotetrafluoroethane, dichlorotrifluoromethane, octafluorocyclobutane, trichloromonofluoromethane, and mixtures of dichlorodifluoromethane and trichloromonofluoromethane.

* * * * *